US008600064B2

(12) United States Patent
Kato et al.

(10) Patent No.: US 8,600,064 B2
(45) Date of Patent: Dec. 3, 2013

(54) APPARATUS, METHOD, AND COMPUTER PROGRAM PRODUCT FOR PROCESSING INFORMATION

(75) Inventors: Taku Kato, Kanagawa (JP); Jun Sato, Tokyo (JP); Shinichi Matsukawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 598 days.

(21) Appl. No.: 12/401,703

(22) Filed: Mar. 11, 2009

(65) Prior Publication Data

US 2009/0232314 A1 Sep. 17, 2009

(30) Foreign Application Priority Data

Mar. 14, 2008 (JP) ................................. 2008-066756

(51) Int. Cl.
*H04L 9/08* (2006.01)
(52) U.S. Cl.
USPC ........... 380/284; 380/277; 380/278; 713/169; 713/171; 726/2

(58) Field of Classification Search
USPC ........ 380/277–278, 284; 713/169, 171; 726/2
See application file for complete search history.

(56) References Cited

U.S. PATENT DOCUMENTS

2004/0078066 A1* 4/2004 Ohta et al. ..................... 607/60

* cited by examiner

*Primary Examiner* — Jung Kim
*Assistant Examiner* — Ayoub Alata
(74) *Attorney, Agent, or Firm* — Turocy & Watson, LLP

(57) ABSTRACT

An information processing apparatus transmits, to another information processing apparatus, designation information that is used to specify at least one of an encrypted secret keys that can be decrypted using a first apparatus secret key, out of an encrypted secret key set contained in a first key management information, receives from the another information processing apparatus, the encrypted secret key specified by the designation information out of the encrypted secret key set contained in a second key management information, obtains a second secret key contained in the second key management information in a secret manner by decrypting the encrypted secret key received by the receiving unit using the first apparatus secret key, and performs the authentication process with the another information processing apparatus using the second secret key.

23 Claims, 6 Drawing Sheets

FIG.2

| ..... | |
|---|---|
| VERSION NUMBER | |
| MEDIA KEY VERIFICATION-PURPOSE RECORD Enc (Km, FIXED DATA) | |
| RECORDS OF ENCRYPTED MEDIA KEYS | '1' | Enc(Kd_1, Km) |
| | ... | ..... |
| | '100' TO '199' | Enc(Kd_k, Km) |
| | ... | ..... |
| | 'xxx' TO 'xxxx' | Enc(Kd_n, Km) |
| ..... | |

APPARATUS, METHOD, AND COMPUTER PROGRAM PRODUCT FOR PROCESSING INFORMATION

CROSS-REFERENCE TO RELATED APPLICATIONS

This application is based upon and claims the benefit of priority from the prior Japanese Patent Application No. 2008-066756, filed on Mar. 14, 2008; the entire contents of which are incorporated herein by reference.

BACKGROUND OF THE INVENTION

1. Field of the Invention

The present invention relates to an information processing apparatus, an information processing method, and an information processing computer program product for performing a mutual authentication process by using key management information that can be updated to invalidate illegitimate devices and/or illegitimate storage media.

2. Description of the Related Art

Conventionally, a content protecting technique called Content Protection for Recordable Media (CPRM) has been applied to SD Memory cards (SD cards), as a mechanism to protect the contents that are written to and read from the SD cards. Also, authentication methods are used as a mechanism to write and read management information to and from SD cards, the management information including, for example, encryption keys used in encrypting processes to protect the contents. In addition, a technique that uses key management information called Media Key Block (MKB) as a mechanism for invalidating illegitimate devices is applied to SD cards. In this situation, illegitimate devices include devices that remove the protection that is realized by a content protecting technique and applied to contents, devices that tamper with contents, and devices that are capable of tampering with contents. The key management information is management information used for disabling illegitimate devices from decrypting encrypted contents stored in storage media such as SD cards (i.e., for invalidating the illegitimate devices or eliminating the illegitimate devices), the illegitimate devices being recognized as illegitimate devices at the time when the key management information is issued by a technical license organization. More specifically, the key management information contains a plurality of encrypted media keys each of which is obtained by encrypting a specific media key by using a different one of a plurality of device keys. The media key is key information used in an authentication process that is performed between a device and a storage medium that communicate with each other. The device key is key information uniquely assigned to each of the devices. At least one device key is stored in each of the devices. When new key management information that invalidates the media key decrypted with the secret key has been generated and a mutual authentication process is performed by using the new key management information, illegitimate devices will fail the authentication process. Thus, it is possible to invalidate the illegitimate devices. Accordingly, the key management information used in this situation needs to be the most updated one that reflects the information of the illegitimate devices that are known to be illegitimate at the point in time when the storage media are manufactured. Otherwise, it is not possible to implement the illegitimate device invalidating process in a proper and efficient manner. Thus, a mechanism has been introduced to SD cards so that the key management information can be updated with newer information.

Unlike magnetic optical disks such as Digital Versatile Disks (DVDs), SD cards have a controller built therein, in addition to a flash memory used for storing data. The controller performs a mutual authentication process with an information processing apparatus so that only legitimate devices (i.e., devices that are not illegitimate devices) are able to write and read data, such as the encryption keys and the key management information, to and from the SD cards. On the other hand, a content protecting technique called Advanced Access Content System (AACS) is applied to High Density DVD (HD DVDs) and Blu-ray Disks (see, for example, Advanced Access Content System (AACS) (http://www.aacsla.com/specifications/specs091/AACS_Spec_Common_0.91.pdf)). This technique uses key management information that has the same purpose and the same name as the MKB described above but has a completely different data structure.

In actuality, however, even with the content protecting techniques implemented in CPRM or AACS, it is not easy to invalidate storage media that have illegitimately been manufactured. For example, although it is possible to invalidate devices and storage media that have illegitimately been manufactured by identifying the secret key stored in each of the storage media, it is, in fact, difficult to identify the secret key stored in each of the devices and the storage media that have illegitimately been manufactured. As a result, a method for efficiently invalidating devices and storage media that have illegitimately been manufactured has been in demand.

SUMMARY OF THE INVENTION

According to one aspect of the present invention, an information processing apparatus that performs a mutual authentication process with another information processing apparatus that stores second key management information and a second apparatus secret key, the second key management information containing an encrypted secret key set that contains one or more encrypted secret keys that are a second secret key each encrypted using a selected one of apparatus secret keys, the apparatus secret keys being respectively assigned to information processing apparatuses, the second apparatus secret key being one of the apparatus secret keys, the first apparatus includes a storage unit that stores first key management information and a first apparatus secret key, the first key management information containing an encrypted secret key set that contains one or more encrypted secret keys that are a first secret key each encrypted using a selected one of the apparatus secret keys, the first apparatus secret key being one of the apparatus secret keys; a first transmitting unit that transmits, to the another information processing apparatus, designation information that is used to specify at least one of the encrypted secret keys that can be decrypted using the first apparatus secret key, out of the encrypted secret key set contained in the first key management information; a receiving unit that receives, from the another information processing apparatus, the encrypted secret key specified by the designation information out of the encrypted secret key set contained in the second key management information; an obtaining unit that obtains the second secret key contained in the second key management information in a secret manner by decrypting the encrypted secret key received by the receiving unit using the first apparatus secret key; and an authenticating unit that performs the authentication process with the another information processing apparatus using the second secret key.

According to another aspect of the present invention, an information processing apparatus that performs a mutual authentication process with another information processing apparatus that stores second key management information and a second apparatus secret key, the second key management information containing an encrypted key set that contains one or more encrypted secret keys that are a second secret key each encrypted using a selected one of apparatus secret keys, the apparatus secret keys being respectively assigned to information processing apparatuses, the second apparatus secret key being one of the apparatus secret keys, the first apparatus includes a storage unit that stores first key management information and a first apparatus secret key, the first key management information containing an encrypted secret key set that contains one or more encrypted secret keys that are a first secret key each encrypted using a selected one of the apparatus secret keys, the first apparatus secret key being one of the apparatus secret keys; a receiving unit that receives, from another information processing apparatus, designation information that specifies at least one of the encrypted secret keys of an encrypted secret key set that contains the one or more encrypted secret keys that are a second secret key each encrypted using a selected one of the apparatus secret keys, the encrypted secret key set being contained in first key management information; a first transmitting unit that transmits, to the another information processing apparatus, the one of the encrypted secret keys specified by the designation information, out of the encrypted secret keys contained in the first key management information stored in the storage unit; and an authenticating unit that performs an authentication process with the another information processing apparatus using the secret key.

According to still another aspect of the present invention, an information processing method implemented in an information processing apparatus that performs a mutual authentication process with another information processing apparatus that stores key management information and at least one of a plurality of apparatus secret keys, the key management information containing a plurality of encrypted secret keys each of which is a secret key encrypted by using a different one of the apparatus secret keys respectively assigned to information processing apparatuses, the method includes transmitting to the another information processing apparatus, designation information that specifies at least one of the encrypted secret keys that can be decrypted by using the apparatus secret key, out of the encrypted secret keys contained in the key management information usable by the information processing apparatus; receiving from the another information processing apparatus, the one of the encrypted secret keys specified by the designation information out of the encrypted secret keys contained in the key management information stored in the another information processing apparatus; obtaining the secret key by decrypting the encrypted secret key received by the first receiving unit by using the apparatus secret key; and performing an authentication process with the another information processing apparatus based on the secret key.

A computer program product according to still another aspect of the present invention causes a computer to perform the methods according to the present invention.

BRIEF DESCRIPTION OF THE DRAWINGS

FIG. 2 is a drawing of an exemplary data structure of an MKB according to the embodiment;

DETAILED DESCRIPTION OF THE INVENTION

According to an embodiment of the present invention, MKBs that are used in AACS or the like are used as key management information. The explanation below will be based on an example in which the two information processing apparatuses that perform a mutual authentication process are: a memory card, such as an SD card, that includes a controller and a storage area to which access control is applied as a security function; and a host that executes an application program (hereinafter, an "application") to write and read data to and from the memory card.

The host includes, a least, a controlling device such as a Central Processing Unit (CPU) that controls the overall control of the apparatus; storage devices such as a Read-Only Memory (ROM) and a Random Access Memory (RAM) that store therein various types of data and various types of computer programs (hereinafter, "programs") including various types of applications; and a bus that connects these constituent elements to one another. The host has a hardware configuration to which a commonly-used computer can be applied. In addition, a display device that displays information, input devices such as a keyboard and a mouse that receive inputs of instructions from the user, and a communication interface (I/F) that controls communication with external apparatuses are connected to the host in a wired or wireless manner. On the other hand, the memory card includes the controller including a CPU, a ROM, and a RAM and the storage area that stores therein various types of data and various types of programs.

Figure 1:
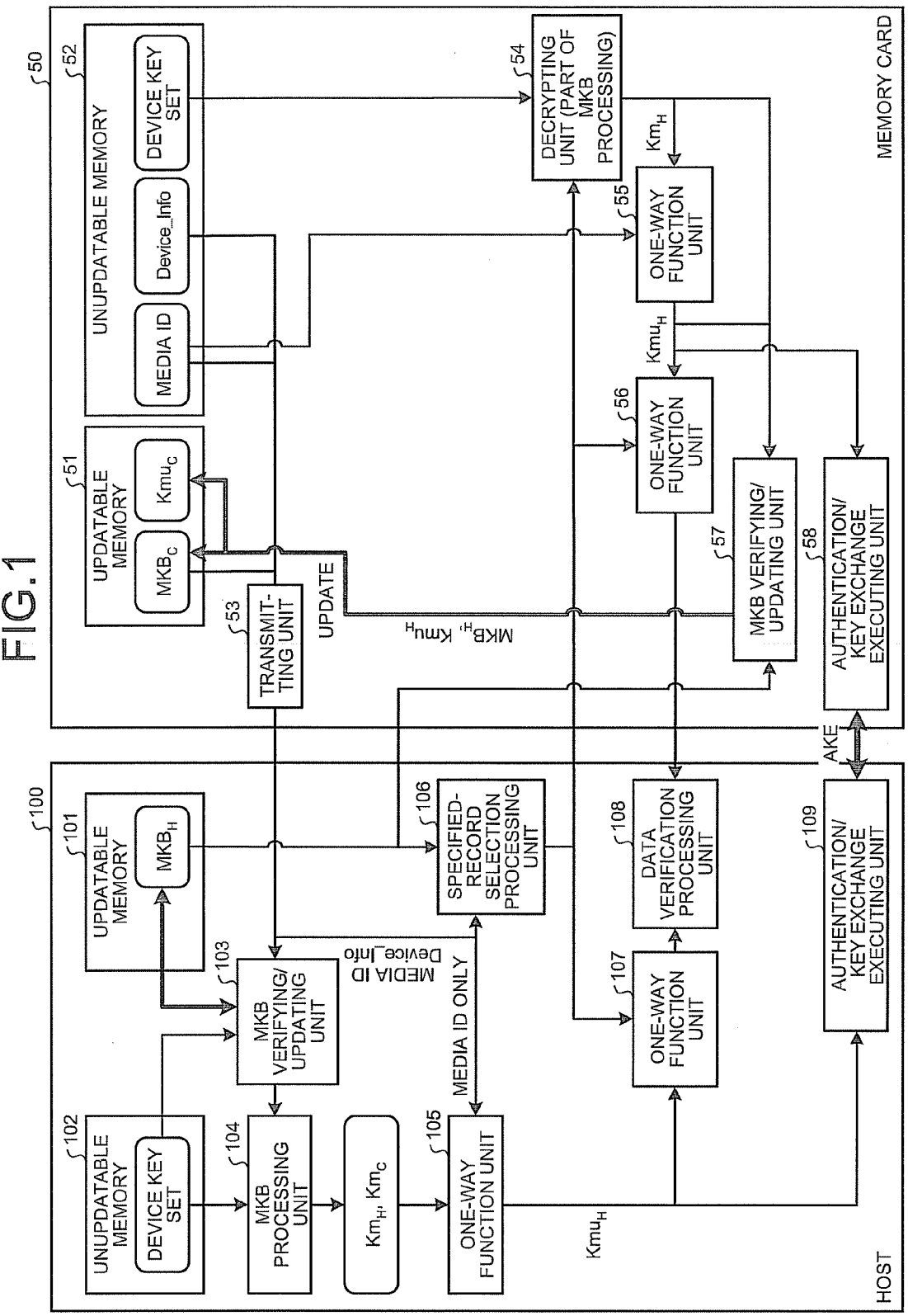
FIG. 1 is a schematic diagram of a host and a memory card according to an embodiment of the present invention.

FIG. 1 is a schematic diagram of the host and the memory card according to the present embodiment. First, in relation to the use of the key management information, data stored in the memory card 50 and data stored in the host 100 will be explained. As the storage area, the memory card 50 includes an updatable memory 51, an unupdatable memory 52, and a storage area (not shown) to which the access control is applied. The updatable memory 51 is a storage area that stores data therein in such a manner that it is possible to update the data. The updatable memory 51 stores therein an $MKB_c$ and a media unique key $Kmu_c$. The unupdatable memory 52 is a storage area that stores data therein in such a manner that it is not possible to update the data. The unupdatable memory 52 stores therein a media ID, a device key set, and a device information number called Device_info (Device-node). The media ID is media identification information that is able to uniquely identify the memory card 50 and corresponds to identification information. The $MKB_c$ is key management information that contains a plurality of encrypted media keys (i.e., encrypted secret keys) each of which is a media key (i.e., a secret key) encrypted by using a different one of a plurality of device keys. The device key set is key information that is assigned to each of the information processing apparatuses such as the memory card 50 and the host 100. The device key set is key information that contains at least one device key with which it is possible to decrypt the encrypted media key and corresponds to an apparatus secret key. In the following explanation, it is assumed that the device key set is uniquely assigned to each of the information processing apparatuses.

The device information number is index information that is able to identify the device key set. The device information number corresponds to designation information and is used for specifying the encrypted media keys contained in the MKB. An encrypted media unique key is obtained by encrypting the media key with a media ID and corresponds to a secret unique key.

In the following explanation, when it is necessary to distinguish the key management information stored in the memory card 50 from the key management information stored in the host 100, the former will be referred to as an $MKB_c$, whereas the latter will be referred to as an $MKB_H$. When it is not necessary to distinguish them from each other, each of them will be simply referred to as an MKB. In addition, when it is necessary to distinguish the device key set stored in the memory card 50 from the device key set stored in the host 100, the former will be referred to as a $Kd_{ci}$, whereas the latter will be referred to as a $Kd_{Hi}$. Further, when it is necessary to distinguish a media key decrypted based on the $MKB_c$ from a media key decrypted based on the $MKB_H$, the former will be referred to as a $Km_c$, whereas the latter will be referred to as a $Km_H$. When it is not necessary to distinguish them from each other, each of them will be simply referred to as a Km. Also, when it is necessary to distinguish a media unique key generated based on the $MKB_c$ from a media unique key generated based on the $MKB_H$, the former will be referred to as a $Kmu_c$, whereas the latter will be referred to as a $Kmu_H$. When it is not necessary to distinguish them from each other, each of them will be simply referred to as a Kmu.

Next, the data structure of the MKB will be explained, with reference to FIG. 2. As shown in FIG. 2, the MKB contains a version number, a media key verification-purpose record, and a plurality of encrypted media keys. The version number indicates the version of the MKB and is information (called comparison management information) that makes it possible to compare the level of newness of the MKB. The media key verification-purpose record is used for verifying the MKB when the memory card 50 has received the MKB from the host 100. More specifically, the media key verification-purpose record is obtained by encrypting fixed data (e.g., a numeric sequence such as "01234XXX") by using the media key Km. The encrypted media keys are contained in the MKB while the records thereof are separated from each other in correspondence with each of the disk information numbers or each of groups of disk information numbers. For example, an encrypted media key corresponding to the disk information number "1" and an encrypted media key corresponding to the disk information numbers from "100" to "199" are contained in the MKB as separate records. As explained above, a device key set is in correspondence with each of the disk information numbers. Thus, it is possible to decrypt each of the encrypted media keys by using one of the device keys contained in the device key set corresponding to the disk information number.

Returning to the description of FIG. 1, like the memory card 50, the host 100 includes an updatable memory 101 and an unupdatable memory 102. The updatable memory 101 stores therein the $MKB_H$. The $MKB_H$ may be written into the host 100 when the applications executed by the host 100 are manufactured (or shipped) or may be distributed to the host 100 via a network or other media after the application programs have been shipped. The unupdatable memory 102 stores therein the device key set $Kd_{Hi}$ that is necessary for decrypting the $MKB_H$ stored in the updatable memory 101.

Next, within the various types of functions that are realized in the hardware configuration described above when the CPU (controller) in the memory card 50 executes the various types of programs stored in the ROM and the storage areas, some functions with which the present embodiment is characterized will be explained. In the following explanation, it is assumed that the memory card 50 uses, as key management information that is usable by the memory card 50, the $MKB_c$ stored in the updatable memory 51. The memory card 50 realizes the functions of a transmitting unit 53, a decrypting unit 54, a one-way function unit 55, a one-way function unit 56, an MKB verifying/updating unit 57, and an authentication/key exchange executing unit 58. The transmitting unit 53 transmits, to the host 100, the $MKB_c$ stored in the updatable memory 51 and the media ID and the device information number stored in the unupdatable memory 52. In the case where the $MKB_c$ is older than the $MKB_H$ stored in the host 100, the decrypting unit 54 receives, from the host 100, the encrypted media key that constitutes a part of the records (hereinafter, "a partial record") of the $MKB_H$ and is specified by the device information number thereof (i.e., the encrypted media key that corresponds to the device key set $Kd_{ci}$ identified with the device information number thereof). Subsequently, the decrypting unit 54 decrypts the received encrypted media key by using one of the device keys contained in the device key set $Kd_{ci}$ and obtains the media key $Km_H$. The one-way function unit 55 converts the media key $Km_H$ by using the media ID and performing a one-way function calculation and obtains the media unique key $Kmu_H$. The one-way function unit 56 converts the encrypted media key that has been received by the decrypting unit 54 by using the media unique key $Kmu_H$ and performing a one-way function calculation so as to generate response data Krc and transmits the generated response data Krc to the host 100. According to the result of a verifying process performed by the host 100, the MKB verifying/updating unit 57 receives the entirety of the $MKB_H$ from the host 100 and verifies the received $MKB_H$. Subsequently, according to the result of this verifying process, the MKB verifying/updating unit 57 replaces the $MKB_c$ stored in the updatable memory 51 with the $MKB_H$, and also, replaces the media unique key $Kmu_c$ stored in the updatable memory 51 with the media unique key $Kmu_H$ that has been obtained by the one-way function unit 55 based on the $MKB_H$. The authentication/key exchange executing unit 58 executes an authentication and key exchange process for realizing encrypted communication by using the media unique key Kmu that is shared between the memory card 50 and the host 100.

Next, within the various types of functions that are realized when the controlling device included in the host 100 executes the various types of programs stored in the storage devices and the external storage devices, some functions with which the present embodiment is characterized will be explained. The host 100 realizes the functions of an MKB verifying/updating unit 103, an MKB processing unit 104, a one-way function unit 105, a specified-record selection processing unit 106, a one-way function unit 107, a data verification processing unit 108, and an authentication/key exchange executing unit 109. When having received the $MKB_c$, the media ID, and the device information number from the memory card 50, the MKB verifying/updating unit 103 verifies authenticity of the $MKB_c$ while using the device key set $Kd_{Hi}$ stored in the unupdatable memory 102. Also, the MKB verifying/updating unit 103 compares the levels of newness of the $MKB_c$ and the $MKB_H$ stored in the updatable memory 101. In the case where the $MKB_H$ is older than $MKB_c$, the MKB verifying/updating unit 103 replaces the $MKB_H$ stored in the updatable memory 101 with the $MKB_c$. On the contrary, in the case where the $MKB_H$ is newer than $MKB_c$, the MKB verifying/updating unit 103 transmits the device information number to the specified-record selection processing unit 106.

The specified-record selection processing unit 106 transmits, to the memory card 50, the encrypted media key that constitutes a partial record of the $MKB_H$ stored in the updatable memory 101 and is specified by the device information number that has been received from the MKB verifying/updating unit 103 (i.e., the encrypted media key that corresponds to the device key set $Kd_{ci}$ identified with the received device information number). The MKB processing unit 104 decrypts the encrypted media key that has been transmitted to the memory card 50 by the specified-record selection processing unit 106 by using one of the device keys contained in the device key set $Kd_{Hi}$ stored in the unupdatable memory 102 and obtains the media key $Km_H$. The one-way function unit 105 converts the media key $Km_H$ that has been obtained by the MKB processing unit 104, by using the media ID received from the memory card 50 and performing a one-way function calculation and obtains the media unique key $Kmu_H$. The one-way function unit 107 converts the encrypted media key that has been transmitted to the memory card 50 by the specified-record selection processing unit 106, by using the media unique key $Kmu_H$ that has been obtained by the one-way function unit 105 and performing a one-way function calculation and obtains converted data Krh. When having received the response data Krc from the memory card 50 in response to the transmission of the encrypted media key performed by the specified-record selection processing unit 106, the data verification processing unit 108 verifies the response data Krc by comparing the response data Krc with the converted data Krh. After that, according to the result of the verification process, the data verification processing unit 108 transmits the entirety of the $MKB_H$ to the memory card 50.

Figure 3:
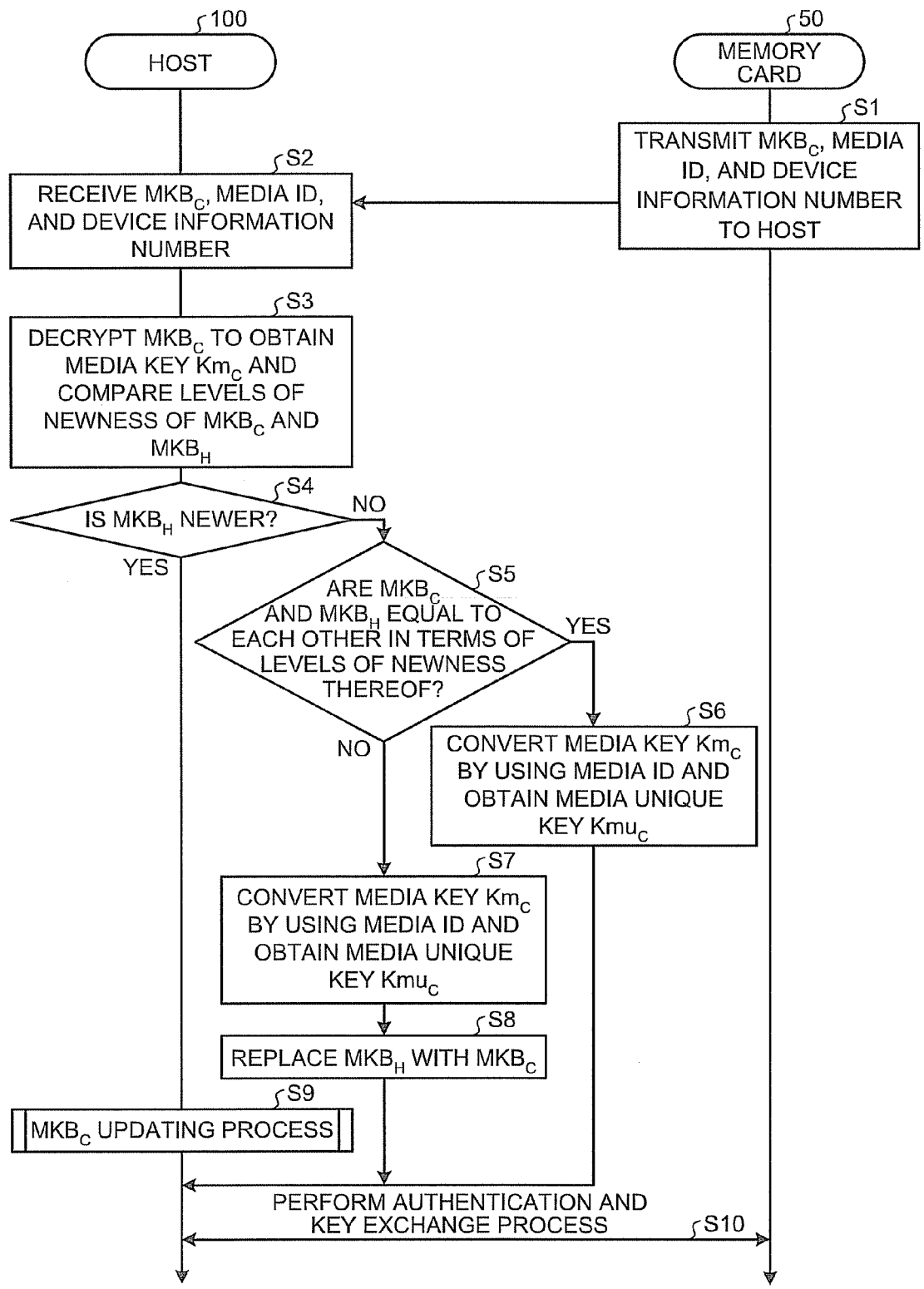
FIG. 3 is a flowchart of a procedure in a process performed by a host and a memory card according to the embodiment.

Next, a procedure in the process performed by the host 100 and the memory card 50 according to the present embodiment will be explained with reference to FIG. 3. The memory card 50 transmits the $MKB_c$, the media ID, and the device information number that are stored therein to the host 100 (step S1). When the host 100 has received the $MKB_c$, the media ID, and the device information number from the memory card 50 (step S2), the host 100 verifies authenticity of the $MKB_c$ by using the device key set $Kd_{Hi}$ stored in the unupdatable memory 102 and also compares the levels of the newness of the $MKB_c$ and the $MKB_H$ that is stored in the updatable memory 101 (steps S3 and S4). It is possible to verify authenticity of the $MKB_c$ by obtaining the media key $Km_c$ by decrypting the $MKB_c$ with one of the device keys contained in the device key set. Also, it is possible to compare the levels of newness of the $MKB_c$ and the $MKB_H$ by comparing the version numbers contained therein. The MKB that contains the newer version number is considered as a newer MKB. As a result of the comparing process, in the case where the $MKB_c$ and the $MKB_H$ are equal to each other in terms of the levels of newness thereof (step S4: No; step S5: Yes), the host 100 converts the media key $Km_c$ that has been obtained at step S3 by using the media ID that has been received at step S2 and performing a one-way function calculation and obtains the media unique key $Kmu_c$ (step S6) After that, the process proceeds to step S10. In the case where the $MKB_H$ is older than the $MKB_c$ (step S4: No; step S5: No), the host 100 obtains the media unique key $Kmu_c$ in the same manner as at step S6 (step S7) and replaces the $MKB_H$ stored in the updatable memory 101 with the $MKB_c$ (step S8), and the process proceeds to step S10.

Figure 4:
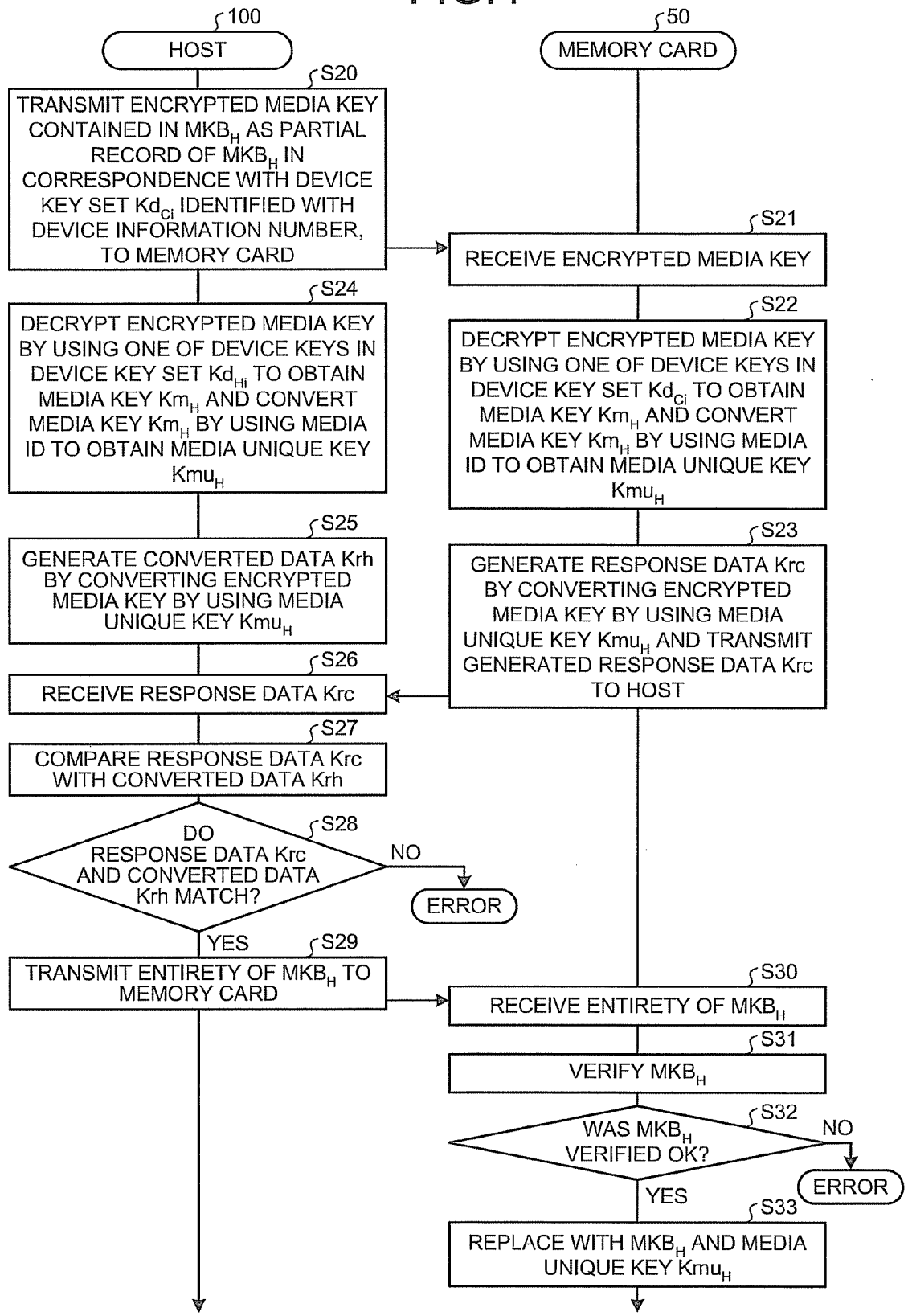
FIG. 4 is a flowchart of a procedure in an updating process according to the embodiment.

On the contrary, in the case where the $MKB_H$ is newer than the $MKB_c$ (step S4: Yes), the host 100 performs an updating process to update the $MKB_c$ stored in the memory card 50 (step S9). FIG. 4 is a flowchart of a procedure in the updating process. First, the host 100 transmits, to the memory card 50, the encrypted media key that constitutes a partial record of the $MKB_H$ and is specified by the device information number that has been received at step S2 (i.e., the encrypted media key that corresponds to the device key set $Kd_{ci}$ identified with the received device information number) (step S20). When the memory card 50 has received the encrypted media key (step S21), the memory card 50 decrypts the received encrypted media key by using one of the device keys contained in the device key set $Kd_{ci}$ stored in the unupdatable memory 52 and obtains the media key $Km_H$. After that, the memory card 50 converts the media key $Km_H$ by using the media ID stored in the unupdatable memory 52 and performing a one-way function calculation and obtains the media unique key $Kmu_H$ (step S22). Subsequently, the memory card 50 converts the encrypted media key that has been received at step S21 by using the media unique key $Kmu_H$ obtained at step S22 and performing a one-way function calculation and generates the response data Krc. The memory card 50 then transmits the generated response data Krc to the host 100 (step S23). The response data Krc is used to inform the host 100 that the memory card 50 has correctly obtained the media unique key $Kmu_H$ in correspondence with the encrypted media key that has been transmitted by the host 100 at step S20. In the present example, it is assumed that the response data Krc is such data that cannot be obtained unless the media key $Km_H$ obtained at step S22 is known. It is also assumed that the media key $Km_H$ obtained at step S22 or the media unique key $Kmu_H$ is such data that cannot be disclosed to a third party. For this reason, although the media unique key $Kmu_H$ is used for generating the response data Krc at step S23, the response data Krc is converted by using the one-way function that uses the media unique key $Kmu_H$ as the key. With this arrangement, it is possible to inform the host 100 that the encrypted media key transmitted at step S20 has properly been received without being disclosed to a third party and that the memory card 50 has correctly obtained the media unique key $Kmu_H$ in correspondence with the encrypted media key.

On the other hand, the host 100 decrypts the encrypted media key that has been transmitted to the memory card 50 at step S20 by using one of the device keys contained in the device key set $Kd_{Hi}$ stored in the updatable memory 101 and obtains the media key $Km_H$ (step S24). After that, the host 100 converts the media key $Km_H$ by using the media ID that has been received from the memory card 50 at step S2 and performing a one-way function calculation and obtains the media unique key $Kmu_H$. Subsequently, the host 100 converts the encrypted media key that has been transmitted to the memory card 50 at step S20 by using the media unique key $Kmu_H$ and performing a one-way function calculation and obtains the converted data Krh (step S25). After that, when the host 100 has received the response data Krc that has been transmitted from the memory card 50 at step S23 (step S26), the host 100 compares the response data Krc with the converted data Krh that has been obtained at step S24 to verify the response data Krc (step S27). In the case where the response data Krc and the converted data Krh do not match (step S28: No), the host 100 determines that the memory card 50 was invalidated or an error has occurred and ends the process. On the contrary, in the case where the response data Krc and the converted data Krh match (step S28: Yes), the host 100 determines that the memory card 50 has not been invalidated and is a legitimate memory card and transmits, to the memory card 50, the entirety of the $MKB_H$ of which only the partial record has been transmitted at step S20 (step S29).

On the other hand, when the memory card 50 has received the $MKB_H$ (step S30), the memory card 50 checks to see (i.e., performs a verification process) whether the $MKB_H$ contains, as a partial record thereof, the encrypted media key received at step S21 by using the media key verification-purpose record contained in the $MKB_H$ (step S31). In other words, the memory card 50 judges whether the encrypted media key received at step S21 is the encrypted secret key that has been transmitted as at least one of the encrypted media keys contained in the $MKB_H$ received at step S30. More specifically, the memory card 50 obtains fixed data by decrypting the media key verification-purpose record by using the media key $Km_H$ obtained from the encrypted media key received at step S21. In the case where the obtained fixed data matches the data that is stored in advance, the memory card 50 determines that the $MKB_H$ that has been received at step S30 contains, as a partial record thereof, the encrypted media key that has been received at step S21. In this situation, the result of the judging process at step S32 is in the affirmative. Thus, the memory card 50 replaces the $MKB_c$ stored in the updatable memory 51 with the $MKB_H$ received at step S30. Also, the memory card 50 decrypts the one of the encrypted media keys contained in the $MKB_H$ that corresponds to the device key set $Kd_{ci}$ stored in the unupdatable memory 52 by using one of the devices keys contained in the device key set $Kd_{ci}$ and obtains the media key $Km_H$. Further, the memory card 50 converts the media key $Km_H$ by using the media ID stored in the unupdatable memory 52 and performing a one-way function calculation and obtains the media unique key $Kmu_H$. The memory card 50 then replaces the media unique key $Kmu_c$ stored in the updatable memory 51 with the media unique key $Kmu_H$ (step S33). On the contrary, in the case where the result of the judging process at step S32 is in the negative, the memory card 50 determines that an error has occurred and ends the process. This is how the host 100 and the memory card 50 perform the process to update the $MKB_H$.

In other words, in the case where the $MKB_H$ is newer than the $MKB_c$, the host 100 and the memory card 50 share the media unique key $Kmu_H$ as a result of the updating process described above. On the other hand, in the case where the $MKB_H$ is older than the $MKB_c$ or in the case where the $MKB_H$ and the $MKB_c$ are equal to each other in terms of the levels of newness thereof, the host 100 and the memory card 50 share the media unique key $Kmu_c$ after the process at step S6 has been performed. In this situation, at step S10 shown in FIG. 3, the host 100 and the memory card 50 perform an authentication and key exchange process for generating a session key used in encrypted communication, by using the media unique key that is shared between themselves. To generate the session key, it is possible to use any of the various methods such as the key exchange methods used in conventional memory cards. When the authentication process is successfully performed in the authentication and key exchange process, the host 100 is able to write and read data to and from the storage area in the memory card 50 to which the access control is applied. When the data is written to and read from the storage area, the host 100 and the memory card 50 perform encrypted communication by using the generated session key.

In the case where the $MKB_c$ is newer than the $MKB_H$ (step S4: No; step S5: No), the $MKB_H$ is replaced with the $MKB_c$ at step S8. However, if the host 100 is invalidated with the $MKB_c$, the media unique key that has been obtained by the host 100 at step S7 does not mach the media unique key that has been obtained by the memory card 50. In that situation, the authentication process in the authentication and key exchange process at step S10 is not successfully performed. Thus, in that situation, the illegitimate host that has been invalidated is not able to write and read data to and from the memory card 50.

As explained above, the device key set containing the device keys that are necessary for decrypting the MKB (i.e., the key management information) is stored not only in the host 100 but also in the memory card 50 that has the controller built therein. By using the device key set stored therein respectively, the host 100 and the memory card 50 each decrypt the media key that is kept secret by the MKB. Further, only in the case where the media unique keys that are obtained when the host 100 and the memory card 50 convert the media key by using the media ID match, the host 100 and the memory card 50 are able to continue the mutual authentication process. In addition, as a mechanism to allow a management entity who manages the content protection system to efficiently generate the MKB that that has been used to invalidate the device key set stored secretly in the memory card 50, the additional function is provided to request the host 100 to perform a part of the process to decrypt the MKB. With this arrangement, even in the case where reverse engineering is performed on the memory card 50 that has legitimately been manufactured so as to extract all the information including the device key set from the memory card 50 and to manufacture an illegitimate memory card (i.e., a clone storage medium) by using the extracted information, it is possible for the management entity to efficiently identify the device key set that is stored in the clone storage medium.

In other words, according to the present embodiment, in the case where a storage medium such as a memory card has illegitimately been manufactured, it is possible to realize the function to efficiently invalidate the illegitimate storage medium, in addition to the function to invalidate illegitimate devices, which is realized in CPRM or AACS.

In the embodiment described above, an arrangement is acceptable in which the various types of programs executed by the host 100 or the memory card 50 are stored in a computer connected to a network such as the Internet so that the various types of programs are provided as being downloaded via the network. Further, another arrangement is also acceptable in which the host 100 includes a drive that reads data from a computer-readable storage medium such as a Compact Disk Read-Only Memory (CD-ROM), a flexible disk (FD), a Compact Disk Recordable (CD-R), a Digital Versatile Disk (DVD), or the like, so that the various types of programs stored in the storage medium are provided as being read via the drive and installed.

In the embodiment described above, the example in which the host 100 and the memory card 50 are used as the two information processing apparatuses that perform the mutual authentication process is explained. However, the examples of the two information processing apparatuses that perform the mutual authentication process are not limited to these. In addition, in the embodiment described above, the memory card 50 serving as one of the information processing apparatuses stores therein, in advance, the MKB, the device key set, the media ID, and the media unique key. However, another arrangement is acceptable in which the one of the information processing apparatuses does not store therein all of these pieces of information, but stores therein the device key, for example, and obtains the MKB, the media ID, and the media unique key from a storage medium that is removably attached to the information processing apparatus and stores therein these pieces of information. In other words, in this arrangement, the one of the information processing apparatuses uses the MKB stored in the storage medium as the key management information that is usable by the information processing apparatus.

Further, yet another arrangement is acceptable in which the two information processing apparatuses that perform the mutual authentication process are a drive that writes and reads data to and from a magnetic optical disk such as a DVD and an information processing apparatus (i.e., an application installed in a Personal Computer [PC]) that writes and reads data to and from the magnetic optical disk via the drive. In this situation, the information processing apparatus into which the application, which can be copied more easily, is installed is configured so as to realize the same functions as those of the memory card 50 explained above, whereas the drive is configured so as to realize the same functions as those of the host 100 explained above. In this arrangement, the application transmits the device information number corresponding to the device key that is kept secret to the drive, so that the drive takes out the encrypted media key that corresponds to the device information number received out of the MKB recorded on the magnetic optical disk and transmits the encrypted media key back to the application side. With this arrangement, in the case where an illegitimate application obtained by illegitimately copying the application has become available, the management entity is able to identify the device key set stored in the illegitimate application.

As additional information, the drive is capable of not only constantly reading the MKB from the magnetic optical disk, but also storing the MKB in a nonvolatile memory included therein and keeping the MKB stored in the nonvolatile memory the most updated by using the MKBs transmitted from the magnetic optical disk and the application.

In the embodiment described above, the memory card 50 stores therein the media unique key; however, the present invention is not limited to this example. Another arrangement is acceptable in which the memory card 50 stores therein the media key. In this situation, the memory card 50 does not obtain the media unique key at step S22, but converts the encrypted media key by using the media key, generates the response data Krc, and transmits the generated response data Krc to the host 100 at step S23. On the other hand, the host 100 does not obtain the media unique key at step S24, but converts the encrypted media key by using the media key and generates the converted data Krh at step S25. The host 100 then compares the response data Krc with the converted data Krh and, according to the result of the comparing process, the host 100 transmits the entirety of the $MKB_H$ to the memory card 50. Subsequently, the host 100 performs the authentication and key exchange process at step S10 by using the media key that is shared between the host 100 and the memory card 50. With this arrangement also, the management entity is able to efficiently identify the device key set stored in an illegitimate memory card.

Figure 5:
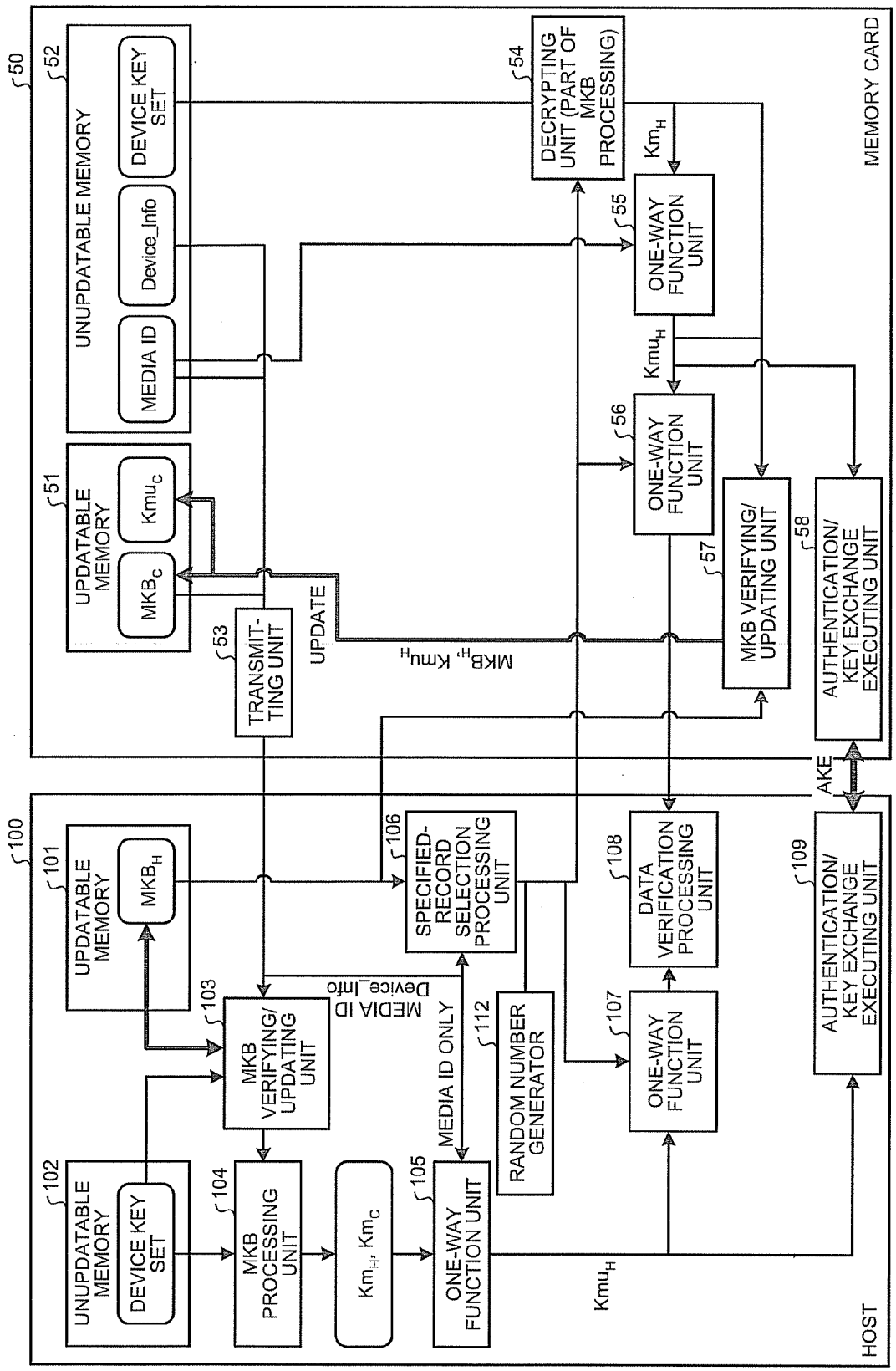
FIG. 5 is a schematic diagram of the host and the memory card according to a modification example of the embodiment.

In the embodiment described above, the host 100 transmits the encrypted media key obtained by encrypting the media key to the memory card 50 at step S20; however, the present invention is not limited to this example. Another arrangement is acceptable in which, for example, the host 100 generates a random number every time and transmits data (i.e., encrypted data) obtained by encrypting the random number and the media key with the device key to the memory card 50. In this situation, as shown in FIG. 5, the host 100 includes a random number generator 112. The specified-record selection processing unit 106 generates the encrypted data by using the random number generated by the random number generator 112, the $MKB_H$ and the device information number stored in the updatable memory 101 and transmits the generated encrypted data to the memory card 50. With this arrangement, the host 100 is able to change, every time, the data to be transmitted to the memory card 50 for which the encrypted media key corresponding to the device information number is the same. The response data that is transmitted to the host 100 after the memory card 50 coverts the data by using the media unique key in the same manner as described above may be different every time. Thus, with this arrangement, even if the memory card 50 illegitimately obtains and transmits the response data, the host 100 is able to determine that the memory card 50 is an illegitimate device and refrains from transmitting the entirety of the MKB to the memory card 50. In this situation, another arrangement is acceptable in which the $MKB_H$ contains, in advance, data obtained by encrypting the media key and the random number by using each of the device keys, as the records thereof.

Further, yet another arrangement is acceptable in which the host 100 transmits, to the memory card 50, data obtained by encrypting the version number and the media key contained in the $MKB_H$ by using the device key. In this situation, an additional arrangement is acceptable in which the $MKB_H$ contains, in advance, data obtained by encrypting the media key and the version number by using each of the device keys, as the records thereof. Further, yet another arrangement is acceptable in which the host 100 transmits, to the memory card 50, data obtained by encrypting the random number and the version number and the media key contained in the $MKB_H$. In this situation, an additional arrangement is acceptable in which the $MKB_H$ contains, in advance, data obtained by encrypting the random number, the version number, and the media key by using each of the device keys, as the records thereof.

In the embodiment described above, the version numbers are used as the comparison management information that is contained in the MKBs and makes it possible to compare the levels of newness of the MKBs; however, the present invention is not limited to this example. Another arrangement is acceptable in which, for example, the date on which each MKB was created is used as the comparison management information.

In the embodiment described above, in the case where the $MKB_C$ and the $MKB_H$ are equal to each other in terms of the levels of newness thereof, the host 100 obtains the media unique key Kmu based on the $MKB_C$ at step S6; however, the present invention is not limited to this example. Another arrangement is acceptable in which the host 100 obtains the media unique key Kmu based on the $MKB_H$.

Figure 6:
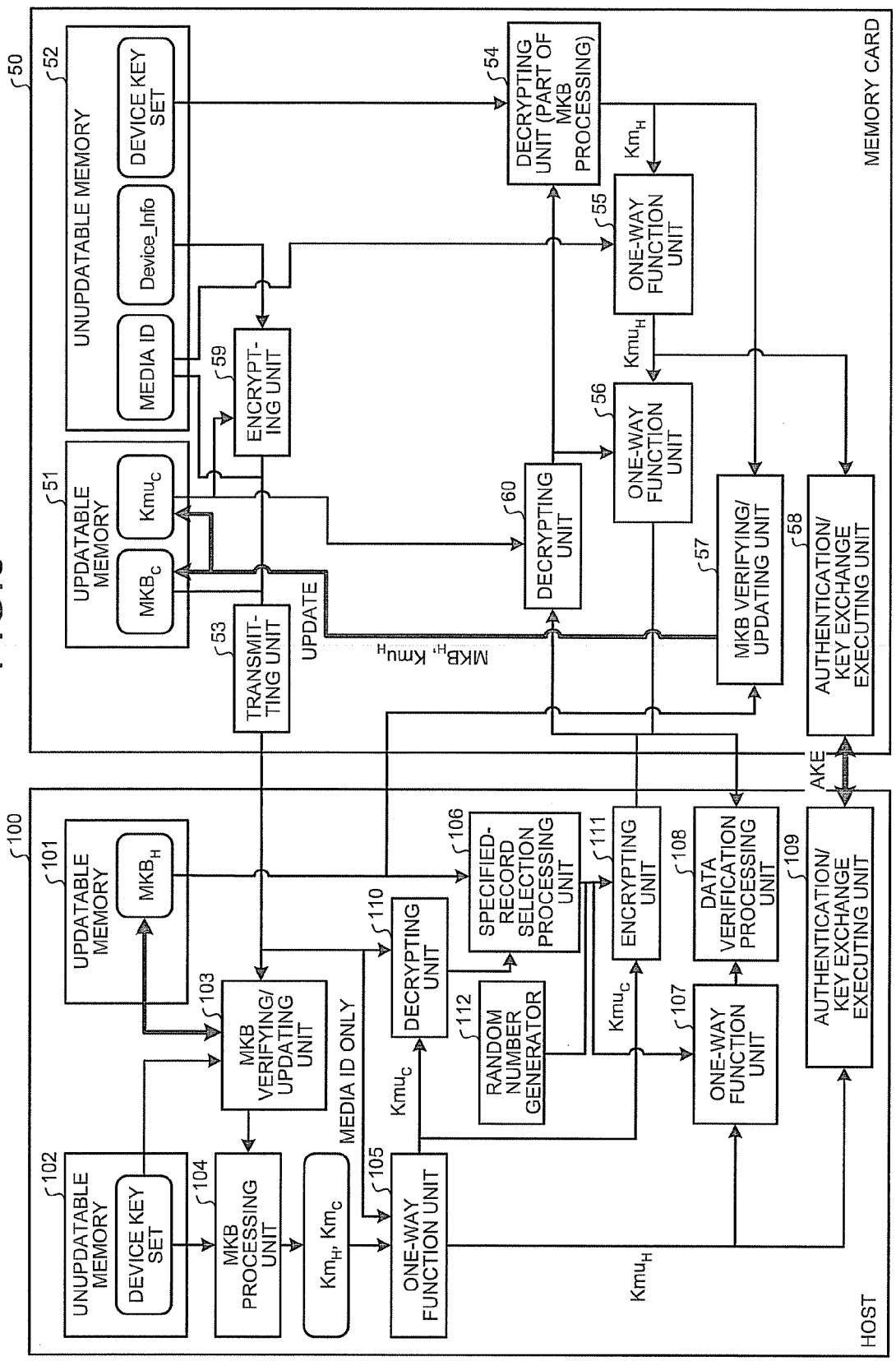
FIG. 6 is a schematic diagram of the host and the memory card according to another modification example of the embodiment.

In the embodiment described above, another arrangement is acceptable in which the memory card 50 encrypts the device information number and transmits the encrypted device information number to the host 100 at step S1, whereas the host 100 encrypts the encrypted media key by using the media unique key $Kmu_c$ and transmits the encrypted media key that has been encrypted to the memory card 50 at step S20. FIG. 6 is a schematic diagram of the host 100 and the memory card 50 according to this arrangement. As shown in FIG. 6, the host 100 further realizes the functions of an encrypting unit 59 and a decrypting unit 60. The encrypting unit 59 encrypts the device information number stored in the unupdatable memory 52 by using the media unique key $Kmu_c$ stored in the updatable memory 51 and transmits the encrypted device information number to the transmitting unit 53. The transmitting unit 53 then transmits the device information number that has been encrypted (i.e., the encrypted device information number), the $MKB_C$ stored in the updatable memory 51, and the media ID stored in the unupdatable memory 52 to the host 100. The decrypting unit 60 receives a second encrypted media key that is obtained by further encrypting the encrypted media key by using the media unique key $Kmu_c$, decrypts the second encrypted media key by using the media unique key $Kmu_c$ stored in the updatable memory 51 so as to obtain the encrypted media key and transmits the obtained encrypted media key to the decrypting unit 54.

On the other hand, the host 100 further realizes the functions of a decrypting unit 110 and an encrypting unit 111. The decrypting unit 110 decrypts the encrypted device information number that has been transmitted from the memory card 50 by using the media unique key $Kmu_c$ that has been obtained by the one-way function unit 105 based on the $MKB_c$ received by the MKB verifying/updating unit 103 from the memory card 50 so as to obtain the device information number and transmits the obtained device information number to the specified-record selection processing unit 106. The specified-record selection processing unit 106 then transmits, to the encrypting unit 111, the encrypted media key that constitutes a partial record of the $MKB_H$ stored in the updatable memory 101 and corresponds to the device key set $Kd_{ci}$ identified with the device information number received from the decrypting unit 110. The encrypting unit 111 encrypts the encrypted media key received from the specified-record selection processing unit 106 by using the media unique key $Kmu_c$ that has been obtained by the one-way function unit 105 based on the $MKB_c$ received by the MKB verifying/updating unit 103 from the memory card 50 and transmits the encrypted media key that has been encrypted to the memory card 50.

With this arrangement, it is possible to efficiently invalidate memory cards that have illegitimately been manufactured while enhancing the level of secrecy of the information communicated between the host and the memory card.

In the embodiment described above, the memory card 50 includes the one-way function units 55 and 56 so that the data is converted through the one-way function calculations; however, the present invention is not limited to this example. Another arrangement is acceptable in which the memory card 50 includes a converting unit that converts the data through other calculation processes. Similarly, it is also acceptable to configure the host 100 so as to include, instead of the one-way function units 105 and 107, a converting unit that converts the data through other calculation processes.

In the embodiment described above, the media ID is used as the identification information; however, the present invention is not limited to this example. The identification information may be any information that is able to uniquely identify each of the information processing apparatuses. Further, in the embodiment described above, the device key is used as the apparatus secret key; however, the present invention is not limited to this example. The apparatus secret key may be any key information that is assigned to each of the information processing apparatuses. Furthermore, in the embodiment described above, the device information number is used as the designation information; however, the present invention is not limited to this example. The designation information may be any information that is able to specify the encrypted media key contained in the MKB.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus that performs a mutual authentication process with another information processing apparatus that stores second key management information and a second apparatus secret key, the second key management information containing a second encrypted secret key set that contains one or more second encrypted secret keys, each of the one or more second encrypted secret keys being a second secret key and being encrypted using a selected one of apparatus secret keys, the apparatus secret keys being respectively assigned to information processing apparatuses, the second apparatus secret key being one of the apparatus secret keys, the information processing apparatus comprising:

a storage unit that stores first key management information and a first apparatus secret key, the first key management information containing a first encrypted secret key set that contains one or more first encrypted secret keys, each of the one or more first encrypted secret keys being a first secret key and being encrypted using a selected one of the apparatus secret keys, the first apparatus secret key being one of the apparatus secret keys;

a first transmitting unit that transmits, to the another information processing apparatus, designation information that is used to specify at least one encrypted secret key that can be decrypted using the first apparatus secret key, out of the first encrypted secret key set contained in the first key management information, and the first key management information;

a receiving unit that receives, from the another information processing apparatus, the at least one encrypted secret key specified by the designation information out of the second encrypted secret key set contained in the second key management information according to a comparison of a newness of the first key management information with a newness of the second key management information;

an obtaining unit that obtains the second secret key contained in the second key management information in a secret manner by decrypting the at least one encrypted secret key received by the receiving unit using the first apparatus secret key; and an authenticating unit that performs the authentication process with the another information processing apparatus using the second secret key.

2. The apparatus according to claim 1, wherein the first transmitting unit transmits, to the another information processing apparatus, the designation information and the first key management information containing comparison management information used to determine whether the first key management information is newer than the second key management information.

3. The apparatus according to claim 1, further comprising:
a generating unit that generates response data by converting the encrypted secret key received by the receiving unit using the second secret key; and
a second transmitting unit that transmits the response data to the another information processing apparatus.

4. The apparatus according to claim 1, wherein the receiving unit further receives entirety of the second key management information from the another information processing apparatus, according to the response data.

5. The apparatus according to claim 3, wherein the first apparatus secret key is capable of decrypting at least one of the first encrypted secret keys contained in the first encrypted secret key set of the first key management information, and
the first transmitting unit transmits, to the another information processing apparatus, the designation information and the first key management information.

6. The apparatus according to claim 5, wherein:
the receiving unit further receives an entirety or part of the second key management information from the another information processing apparatus according to the response data, and
the apparatus further comprises a first replacing unit that replaces the first key management information to be stored in the storage unit with the second key management information.

7. The apparatus according to claim 6, further comprising a judging unit that judges whether the at least one encrypted secret key received by the receiving unit matches at least one of the second encrypted secret keys contained in the second encrypted secret key set of the second key management information, wherein
the first replacing unit replaces the first key management information to be stored in the storage unit with the second key management information, in response to a result of the judging by the judging unit being affirmative.

8. The apparatus according to claim 7, wherein the authenticating unit stops the authentication process, in response to the result of the judging by the judging unit being negative.

9. The apparatus according to claim 7, wherein
the storage unit further stores first identification information capable of uniquely identifying the information processing apparatus,
the apparatus secret keys are uniquely assigned to the information processing apparatuses, respectively,
the first transmitting unit transmits, to the another information processing apparatus, the designation information, the first key management information, and the first identification information, and
the generating unit generates a secret unique key using the first secret key and the first identification information, and generates the response data by converting the at least one encrypted secret key received by the receiving unit using the generated secret unique key.

10. The apparatus according to claim 7, wherein
the storage unit further stores first identification information capable of uniquely identifying the information processing apparatus and a secret unique key generated using the first key management information and the first identification information, and
the apparatus further comprises a second replacing unit that replaces the secret unique key stored in the storage unit with the secret unique key generated using the second key management information and the first identification information, in response to the result of the judging by the judging unit being affirmative.

11. The apparatus according to claim 9, wherein the authenticating unit performs the authentication process using the secret unique key.

12. An information processing apparatus that performs a mutual authentication process with another information processing apparatus that stores second key management information and a second apparatus secret key, the second key management information containing a second encrypted secret key set that contains one or more second encrypted secret keys, each of the second encrypted secret keys being a second secret key and being encrypted using a selected one of apparatus secret keys, the apparatus secret keys being respectively assigned to information processing apparatuses, the second apparatus secret key being one of the apparatus secret keys, the information processing apparatus comprising:
a storage unit that stores first key management information and a first apparatus secret key, the first key management information containing a first encrypted secret key set that contains one or more first encrypted secret keys, each of the first encrypted secret keys being a first secret key and being encrypted using a selected one of the apparatus secret keys, the first apparatus secret key being one of the apparatus secret keys;
a receiving unit that receives, from another information processing apparatus, designation information that specifies at least one encrypted secret key of the first encrypted secret key set that contains the one or more first encrypted secret keys, and the second key management information;
a first comparing unit that compares a newness of the first key management information with a newness of the second key management information;
a first transmitting unit that transmits to the another information processing apparatus, according to a result generated by the first comparing unit, the at least one encrypted secret key specified by the designation information, out of the first encrypted secret keys contained in the first key management information; and
an authenticating unit that performs the authentication process with the another information processing apparatus using the secret key.

13. The apparatus according to claim 12, wherein
the storage unit stores the first key management information containing first comparison management information that indicates the newness of the key management information,
the receiving unit receives, from the another information processing apparatus, the designation information and the second key management information containing second comparison management information that indicates the newness of the second key management information, and
the first comparing unit compares the first key management information with the second key management information in terms of respective levels of newness, by comparing the second comparison management information contained in the second key management information received by the receiving unit and the first comparison management information contained in the first key management information stored in the storage unit.

14. The apparatus according to claim 12, further comprising a first replacing unit that replaces the first key management information with the second key management information, in response to determining that the second key management information is newer than the first key management information based on a result of the first comparing unit.

15. The apparatus according to claim 12, wherein
the receiving unit further receives response data obtained by converting the encrypted secret key specified by the designation information from the first encrypted secret key set contained in the first key management information using the secret key;
the apparatus comprises an obtaining unit that obtains the first secret key by decrypting one of the first encrypted secret keys contained in the first encrypted secret key set of the first key management information using the first apparatus secret key; and
the apparatus further comprises:
a generating unit that generates converted data by converting the encrypted secret key transmitted by the first transmitting unit using the first secret key;
a second comparing unit that compares the converted data with the response data; and a second transmitting unit that transmits entirety of the first key management information that is stored in the storage unit and contains the encrypted secret key transmitted by the first transmitting unit, to the another information processing apparatus, in response to a determination by the second comparing unit that the converted data and the response data match.

16. The apparatus according to claim 15, wherein
the receiving unit receives the designation information of the another information processing apparatus, the second key management information usable by the another information processing apparatus, and second identification information capable of uniquely identifying the another information processing apparatus, and
the generating unit generates a secret unique key using the first secret key obtained by the obtaining unit and the second identification information, and generates converted data by converting the encrypted secret key transmitted by the first transmitting unit using the generated secret unique key.

17. The apparatus according to claim 16, wherein
the storage unit stores a secret unique key generated using the first key management information, the first identification information and the first apparatus secret key, and
the apparatus further comprises a second replacing unit that replaces the secret unique key stored in the storage unit with the secret unique key generated using the second key management information and the first identification information, in response to a determination by the first comparing unit that the second key management information received by the receiving unit is newer than the first key management information stored in the storage unit.

18. The apparatus according to claim 16, wherein the authenticating unit performs the authentication process using the secret unique key generated based on the first secret key.

19. The apparatus according to claim 15, wherein the authenticating unit stops the authentication process in response to a determination by the second comparing unit that the converted data and the response data do not match.

20. An information processing method implemented in an information processing apparatus that performs a mutual authentication process with another information processing apparatus that stores second key management information and a second apparatus secret key, the second key management information containing a second encrypted secret key set that contains one or more second encrypted secret keys, each of the one or more second encrypted secret keys being a second secret key and being encrypted using a selected one of apparatus secret keys respectively assigned to information processing apparatuses, the second apparatus secret key being one of the apparatus secret keys respectively assigned to the information processing apparatuses, the apparatus comprising a storage unit that stores first key management information and a first apparatus secret key, the first key management information containing a first encrypted secret key set that contains one or more first encrypted secret keys, each of the first encrypted secret keys being a first secret key and being encrypted using a selected one of the apparatus secret keys respectively assigned to the information processing apparatuses, the first apparatus secret key being one of the apparatus secret keys; the method comprising:
transmitting, to the another information processing apparatus, designation information that is used to specify an encrypted secret key that can be decrypted using the first apparatus secret key, out of the first encrypted secret keys contained in the first key management information, and the first key management information;
receiving from the another information processing apparatus, the encrypted secret key specified by the designation information out of the second encrypted secret key set contained in the second key management information based on a comparison of a newness of the first key management information with a newness of the second key management information;
obtaining the second secret key contained in the second key management information in a secret manner by decrypting the encrypted secret key received by the receiving unit using the first apparatus secret key; and
performing the authentication process with the another information processing apparatus using the second secret key.

21. A computer program product having a non-transitory computer readable medium including programmed instructions, when executed by a computer provided in an information processing apparatus that performs a mutual authentication process with another information processing apparatus that stores second key management information and a second apparatus secret key, the second key management information containing a second encrypted secret key set that contains one or more second encrypted secret keys, each of the second encrypted secret keys being a second secret key and being encrypted using a selected one of apparatus secret keys respectively assigned to information processing apparatuses, the second apparatus secret key being one of the apparatus secret keys respectively assigned to the information processing apparatuses, the apparatus comprising a storage unit that stores first key management information and a first apparatus secret key, the first key management information containing a first encrypted secret key set that contains one or more first encrypted secret keys, each of the one or more first encrypted secret keys being a first secret key and being encrypted using a selected one of the apparatus secret keys respectively assigned to the information processing apparatuses, the first apparatus secret key being one of the apparatus secret keys, wherein the instructions cause the computer to perform:
transmitting, to the another information processing apparatus, designation information that is used to specify at least one encrypted secret key that can be decrypted using the first apparatus secret key, out of the first encrypted secret keys contained in the first key management information and the first key management information;
receiving, from the another information processing apparatus, the encrypted secret key specified by the designation information out of the encrypted secret key set contained in the second key management information according to a comparison of a newness of the first key management information with a newness of the second key management information;
obtaining the second secret key contained in the second key management information in a secret manner by decrypting the encrypted secret key received by the receiving unit using the first apparatus secret key; and
performing the authentication process with the another information processing apparatus using the second secret key.

22. A computer program product having a non-transitory computer readable medium including programmed instructions, when executed by a computer provided in an information processing apparatus that performs a mutual authentication process with another information processing apparatus that stores second key management information and a second apparatus secret key, the second key management information containing a second encrypted secret key set that contains one or more second encrypted secret keys, each of the second encrypted secret keys being a second secret key and being encrypted using a selected one of apparatus secret keys respectively assigned to the information processing apparatuses, the second apparatus secret key being one of the apparatus secret keys respectively assigned to the information processing apparatuses, the apparatus comprising a storage unit that stores first key management information and a first apparatus secret key, the first key management information containing a first encrypted secret key set that contains one or more first encrypted secret keys, each of the first encrypted secret keys being a first secret key and being encrypted using a selected one of the apparatus secret keys respectively assigned to the information processing apparatuses, the first apparatus secret key being one of the apparatus secret keys, wherein the instructions cause the computer to perform:

receiving, from another information processing apparatus, designation information that specifies at least one encrypted secret key of the second encrypted secret key set that contains the one or more second encrypted secret keys, and the second key management information;

comparing a newness of the first key management information with a newness of the second key management information;

transmitting to the another information processing apparatus, according to a result of the comparing, the at least one encrypted secret key specified by the designation information, out of the one or more first encrypted secret keys contained in the first key management information; and performing an authentication process with the another information processing apparatus using the secret key.

23. An information processing apparatus that performs a mutual authentication process with another information processing apparatus that stores second key management information and a second apparatus secret key, the second key management information containing an encrypted secret key set that contains one or more encrypted secret keys, each of the encrypted secret keys being a second secret key and being encrypted using a selected one of apparatus secret keys, the apparatus secret keys being respectively assigned to information processing apparatuses, the second apparatus secret key being one of the apparatus secret keys, the information processing apparatus comprising:

a storage unit that stores first key management information, a first apparatus secret key, and designation information, the first key management information containing an encrypted secret key set that contains one or more encrypted secret keys, each of the one or more encrypted secret keys being a first secret key and being encrypted using a selected one of the apparatus secret keys, the first apparatus secret key being one of the apparatus secret keys, the designation information being used to specify at least one of the encrypted secret keys that can be decrypted using the first apparatus secret key, out of the encrypted secret key set contained in the first key management information;

a first transmitting unit that transmits, to the another information processing apparatus, the designation information;

a receiving unit that receives, from the another information processing apparatus, the encrypted secret key specified by the designation information out of the encrypted secret key set contained in the second key management information;

an obtaining unit that obtains the secret key contained in the second key management information in a secret manner by decrypting the encrypted secret key received by the receiving unit using the first apparatus secret key; and an authenticating unit that performs the authentication process with the another information processing apparatus using the second secret key.

\* \* \* \* \*